US008041971B2

(12) United States Patent
Takeuchi

(10) Patent No.: US 8,041,971 B2
(45) Date of Patent: Oct. 18, 2011

(54) EQUIPMENT CONTROLLER, IMAGE FORMING APPARATUS, AND METHOD FOR CONTROLLING EQUIPMENT

(75) Inventor: Ryosuke Takeuchi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 473 days.

(21) Appl. No.: 12/359,671

(22) Filed: Jan. 26, 2009

(65) Prior Publication Data

US 2009/0235100 A1 Sep. 17, 2009

(30) Foreign Application Priority Data

Mar. 17, 2008 (JP) ................................ 2008-068554

(51) Int. Cl.
*G06F 1/00* (2006.01)
*G06F 1/26* (2006.01)
*G06F 1/32* (2006.01)

(52) U.S. Cl. ....................................... 713/320; 713/300

(58) Field of Classification Search .................. 713/300, 713/320

See application file for complete search history.

(56) References Cited

U.S. PATENT DOCUMENTS 5,758,137 A * 5/1998 Armstrong et al. ........... 713/502
6,424,428 B1 7/2002 Takeuchi
6,965,763 B2 * 11/2005 Bussan et al. .............. 455/343.4
7,505,795 B1 * 3/2009 Lim et al. ...................... 455/574
2002/0146096 A1 * 10/2002 Agarwal et al. ............ 379/88.13
2008/0162968 A1 * 7/2008 Breen et al. .................... 713/323
2009/0300390 A1 * 12/2009 Vojak et al. .................... 713/323
2009/0314837 A1 * 12/2009 Kataoka et al. ............... 235/385

FOREIGN PATENT DOCUMENTS

JP 2005-182223 7/2005
JP 2006-235907 9/2006
JP 2006-352914 12/2006

* cited by examiner

*Primary Examiner* — Mark Connolly

(74) *Attorney, Agent, or Firm* — Oblon, Spivak, McClelland, Maier & Neustadt, L.L.P.

(57) ABSTRACT

An equipment controller is disclosed that includes a CPU instructed to switch to a low power mode when being in a non-execution state. The equipment controller determines whether there is any execution task when the state of equipment switches to an energy-saving mode in which consumption power is reduced, and sets the interrupt cycle of a system timer of a real time OS that generates an interrupt for causing the CPU to awaken to be long if there is no execution task so that the CPU is caused to switch to the low power mode.

5 Claims, 12 Drawing Sheets

EQUIPMENT CONTROLLER, IMAGE FORMING APPARATUS, AND METHOD FOR CONTROLLING EQUIPMENT

BACKGROUND OF THE INVENTION

1. Field of the Invention

The present invention generally relates to equipment controllers, image forming apparatuses, and programs and, in particular, to an equipment controller having a CPU capable of switching to a low power mode when the equipment switches to an energy-saving mode, an image forming apparatus, and a program that controls the CPU.

2. Description of the Related Art

As image forming apparatuses such as printers, facsimile machines, copiers, plotters, and multi-task machines having plural such functions, ink jet recording apparatuses using a recording head that ejects, for example, ink liquid droplets are known. The image forming apparatus of this type ejects ink droplets onto a sheet during conveyance from the recording head to perform image formation (used synonymously with recording, printing, and imaging). Examples of the image forming apparatus include a serial-type image forming apparatus in which the recording head ejects liquid droplets to form an image while moving in a main scanning direction and a line-type image forming apparatus using a line-type head in which the recording head ejects liquid droplets to form an image without moving.

Note that in the present invention, the "image forming apparatus" refers to an apparatus that shoots ink droplets onto a medium such as paper, a thread, a fiber, a fabric, leather, metal, a plastic, glass, wood, and a ceramic so as to perform the image formation. Furthermore, the "image formation" refers to forming on the medium not only relevant images such as characters and graphics, but also irrelevant images such as random patterns (i.e., liquid droplets are just ejected and shot out). Furthermore, the "ink" is not limited to one as generally called ink, but it is used as a generic name of various liquid available for the image formation such as recording liquid, fixing treatment liquid, and liquid. Furthermore, the material of the "sheet" is not limited to paper. That is, the sheet refers to ones including an OHP sheet, a fabric, etc., onto which ink droplets are ejected, and it is used as a generic name of one including a medium to be recorded, a recording medium, a recording sheet, a recording paper, etc.

According to an information processing apparatus described in Patent Document 1, when display and music devices are controlled by plural tasks, the use or unused status of the devices is reported by the tasks. In consideration of the reported information and the execution statuses of the devices, optimum low power settings of the devices are calculated to attain energy saving. Furthermore, an information processing apparatus described in Patent Document 2 has a configuration for attaining the same object as the above.

Patent Document 1: JP-A-2005-182223

Patent Document 2: JP-A-2006-235907

According to the configuration of Patent Document 3, even if a printing apparatus such as a facsimile machine switches to an energy-saving mode, it is automatically restored from the energy-saving mode upon receiving data from the outside.

Patent Document 3: JP-A-2006-352914

In an embedded device (system) based on a real time OS, system time is managed. It is known that the embedded device is installed using a cyclic interrupt with a cycle timer. For example, when an image forming apparatus switches to the energy-saving mode to reduce consumption power, it stops supplying power to respective parts. For the processing of a CPU as well, there is no task (program) to be executed in the energy-saving mode. Therefore, the real time OS issues a WAIT instruction to switch to a mode (low power mode) that consumes less power.

However, in the switch to the low power mode by the CPU according to the WAIT instruction from the real time OS, a system timer is set at a predetermined cycle (for example, 1 msec). Therefore, even if there is no task (program) to be executed, a timer interrupt always occurs at a short cycle of 1 msec to cause the CPU to awaken. As a result, the low power mode cannot be appropriately executed at low power. In this case, if the cycle of the system timer is set to be long for attaining low power effects, the respective tasks (programs) cannot maintain hard real time property in general operations.

SUMMARY OF THE INVENTION

The present invention has been made in view of the above problems and may allow more effective energy saving while assuring hard real time property in general operations.

According to an aspect of the present invention, there is provided an equipment controller comprising a CPU that is instructed to switch to a low power mode when being in a non-execution state. The equipment controller determines whether there is any execution task when the state of equipment switches to an energy-saving mode in which consumption power is reduced, and sets the interrupt cycle of a system timer of a real time OS that generates an interrupt for causing the CPU to awaken to be long if there is no execution task so that the CPU is caused to switch to the low power mode.

Preferably, the interrupt cycle of the system timer when the CPU is caused to switch to the low power mode may be set to activation time of a task that awakens next.

Preferably, the equipment controller may further comprise a unit that corrects an error in the system timer.

According to another aspect of the present invention, there is provided an image forming apparatus comprising an equipment controller having a CPU that is instructed to switch to a low power mode when being in a non-execution state. The equipment controller determines whether there is any execution task when a state of equipment switches to an energy-saving mode in which consumption power is reduced, and sets the interrupt cycle of a system timer of a real time OS that generates an interrupt for causing the CPU to awaken to be long if there is no execution task so that the CPU is caused to switch to the low power mode.

According to still another aspect of the present invention, there is provided a method for controlling equipment including a CPU that is instructed to switch to a low power mode when being in a non-execution state. The method comprises the steps of determining whether there is any execution task when the state of equipment switches to an energy-saving mode in which consumption power is reduced; and setting the interrupt cycle of a system timer of a real time OS that generates an interrupt for causing the CPU to awaken to be long if there is no execution task so that the CPU is caused to switch to the low power mode.

According to an equipment controller, an image forming apparatus, and a method for controlling equipment of the embodiment of the present invention, determination is made as to whether there is any execution task when the state of equipment switches to an energy-saving mode in which consumption power is reduced, and the interrupt cycle of a system timer of a real time OS that generates an interrupt for causing the CPU to awaken is set to be long if there is no execution task so that the CPU is caused to switch to the low power mode. Therefore, it is possible to perform more effective energy saving while assuring hard real time property in general operations Note that according to the embodiment of the present invention, a program that executes the method for controlling equipment may be provided.

Other objects, features and advantages of the present invention will become more apparent from the following detailed description when read in conjunction with the accompanying drawings.

DETAILED DESCRIPTION OF THE PREFERRED EMBODIMENTS

Figure 1:
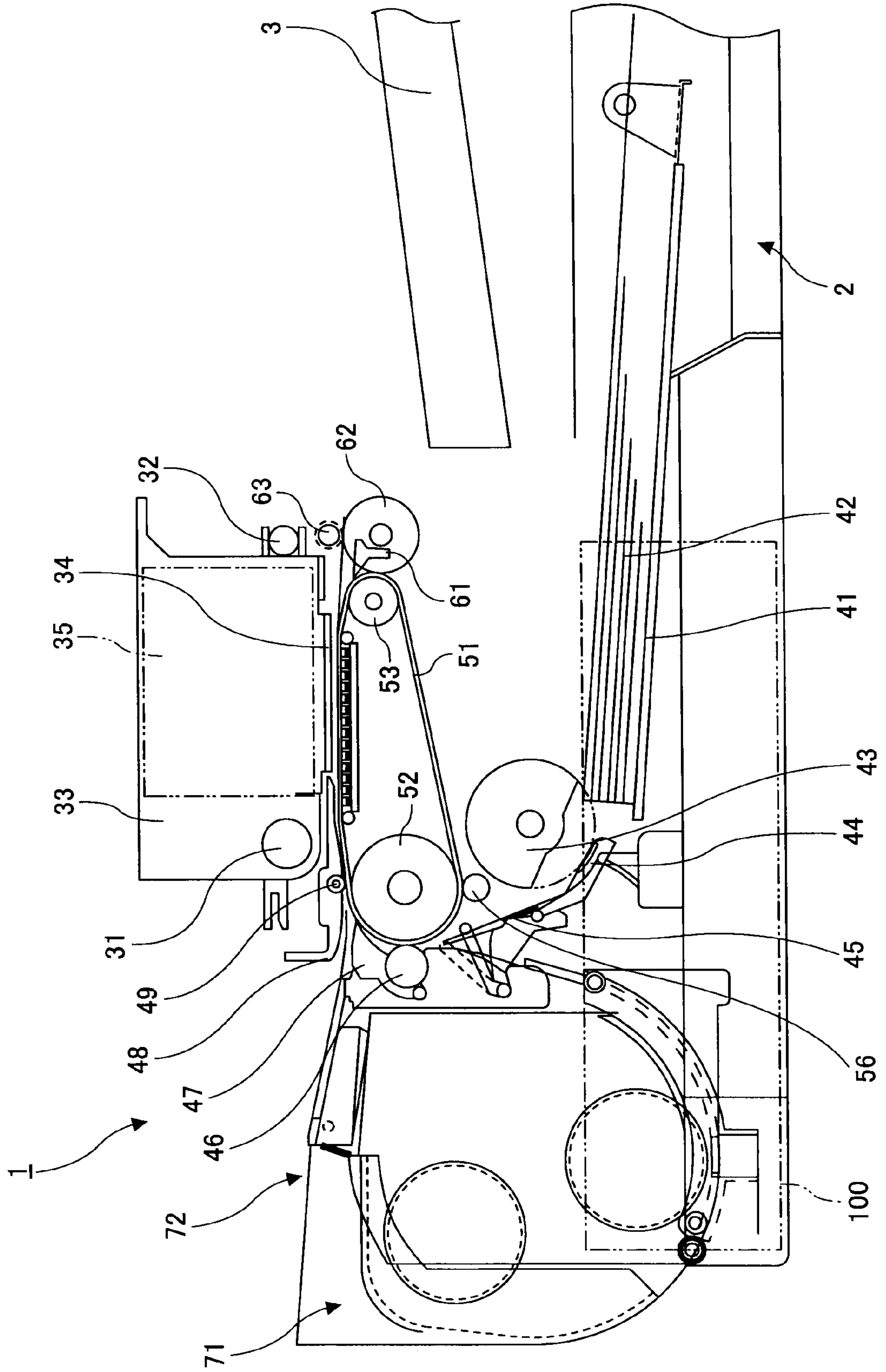
FIG. 1 is a side schematic view for explaining the entire configuration of a mechanism unit of an image forming apparatus according to an embodiment of the present invention.
Figure 2:
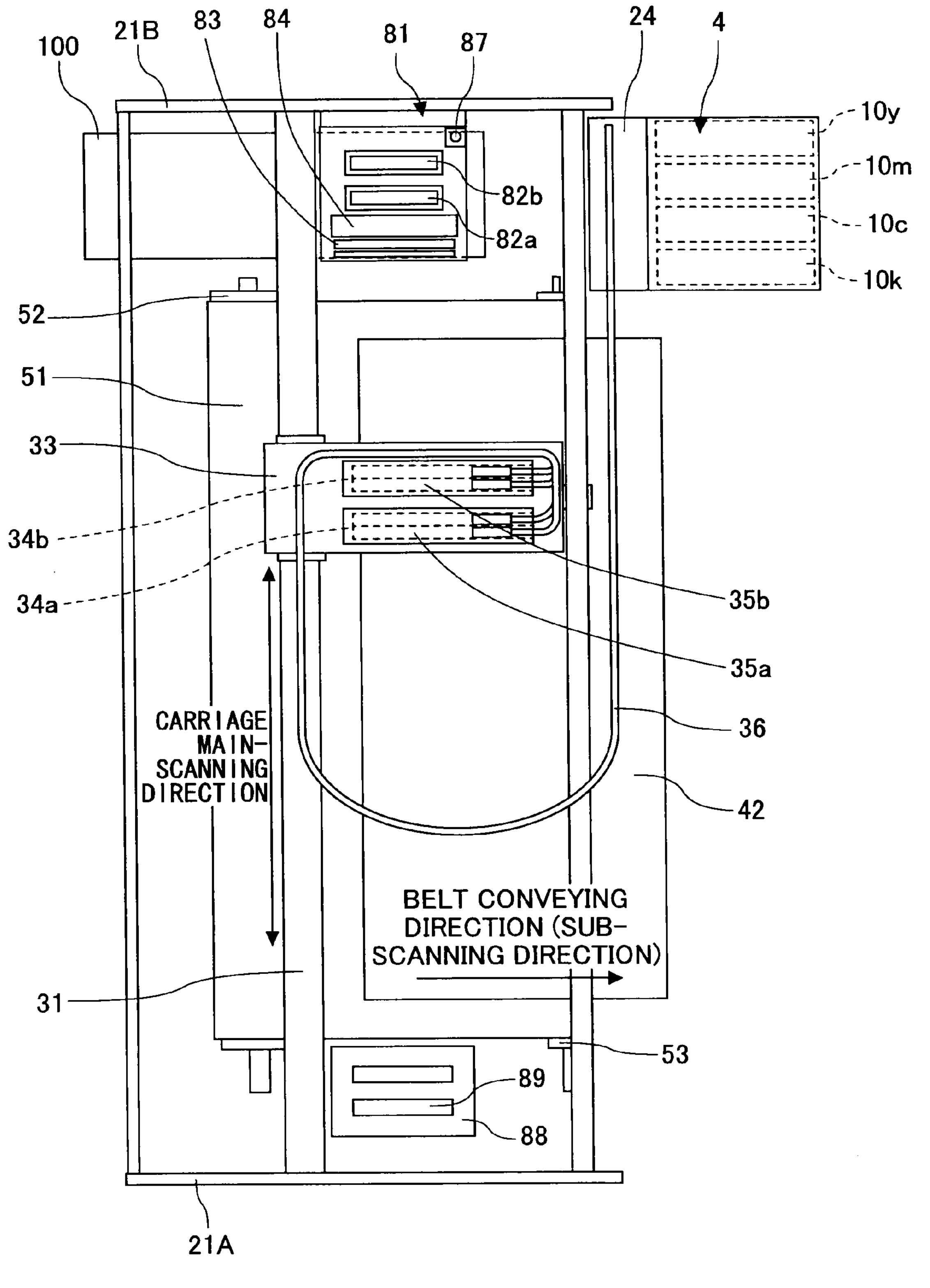
FIG. 2 is a plan view for explaining a substantial part of the mechanism unit.

Referring to the accompanying drawings, an embodiment of the present invention is described below. Referring first to FIGS. 1 and 2, a description is made of an example of an image forming apparatus as equipment according to the embodiment of the present invention. Note that FIG. 1 is a side view for explaining the entire configuration of the image forming apparatus, and FIG. 2 is a plan view for explaining a substantial part of the image forming apparatus.

The image forming apparatus is of a serial-type ink jet recording apparatus in which a carriage 33 is slidably held in a main scanning direction with guide rods 31 and 32 serving as guide members laterally bridged between right and left side plates 21A and 21B of an apparatus main body 1. The carriage 33 is caused to move for scanning in the direction (carriage main-scanning direction) as indicated by an arrow through a timing belt driven by a main scanning motor (not shown).

In the carriage 33, there are installed recording heads 34*a* and 34*b* (hereinafter referred to as a "recording head 34" when they are not discriminated) composed of liquid ejection heads that eject respective colors (yellow (Y), cyan (C), magenta (M), and black (K)) of ink droplets. In this case, nozzle rows each having plural nozzles are arranged in a sub-scanning direction orthogonal to the main-scanning direction, and the ejecting direction of the ink droplets is downward.

The recording head 34 has two nozzle rows each. The recording head 34*a* causes black (K) liquid droplets to be ejected from the nozzles of one nozzle row and cyan (C) liquid droplets to be ejected from those of the other nozzle row. The recording head 34*b* causes magenta (M) liquid droplets to be ejected from the nozzles of one nozzle row and yellow (Y) liquid droplets to be ejected from those of the other nozzle row.

Note that here four colors of liquid droplets are ejected from the two recording heads 34*a* and 34*b*. However, the recording heads for each color may be provided, and one recording head having nozzle rows composed of plural nozzles for ejecting four colors of liquid droplets may be provided.

Furthermore, the carriage 33 has sub-tanks 35*a* and 35*b* (referred to as a "sub-tank 235" when they are not discriminated) as second ink supplying units mounted thereon for supplying the respective colors of ink corresponding to the nozzle rows of the recording head 34. The respective colors of recording liquids are replenished and supplied from ink cartridges 10*y*, 10*m*, 10*c*, and 10*k* detachably attached to a cartridge loading part 4 as first ink supplying units for respective colors of ink to the sub-tank 35 through corresponding colors of supplying tubes 36 by a supplying pump unit 5.

As parts of a sheet feeding unit that feeds sheets 42 stacked on a sheet loading part (pressure plate) 41 of a sheet feeding tray 2, there are provided a semi-circular roller (sheet feeding roller) 43 that separates the sheets 42 one by one from the sheet loading part 41 and feeds the same and a separation pad 44 that faces the sheet feeding roller 43 and is made of a material having a large friction coefficient. The separation pad 44 is biased to the side of the sheet feeding roller 43.

Furthermore, as parts of a conveyance unit that conveys the sheet 42 fed from the sheet feeding unit to the lower side of the recording head 34, there are provided a guide member 45 that guides the sheet 42, a counter roller 46, a conveyance guide member 47, a pressing member 48 having a tip-end pressurizing roller 49, and a conveyance belt 51 as a conveyance unit that electrostatically attracts the fed sheet 42 and conveys the same to the position facing the recording head 34.

The conveyance belt 51 is an endless belt, which is bridged between a conveyance roller 52 and a tension roller 53 and rotates in a belt conveying direction (sub-scanning direction). In addition, there is provided a charging roller 56 as a charging unit that charges the front surface of the conveyance belt 51. The charging roller 56 is brought into contact with the front layer of the conveyance belt 51 and arranged to rotate in conjunction with the rotation of the conveyance belt 51. The conveyance belt 51 rotates in the belt conveying direction shown in FIG. 2 when the conveyance roller 52 is rotated and driven by a sub-scanning motor (not shown) in a timed manner.

Moreover, as parts of a sheet discharging unit that discharges the sheet 42 recorded by the recording head 34, there are provided a separation claw 61 that separates the sheet 42 from the conveyance belt 51, a sheet discharging roller 62, a sheet discharging roller 63, and a sheet catching tray 3 arranged below the sheet discharging roller 62.

Furthermore, a double-sided unit 71 is detachably attached to the back surface side of the apparatus main body 1. The double-sided unit 71 receives the sheet 42 returned when the conveyance belt 51 is rotated in the reverse direction and turns the same upside down, and then it feeds the inverted sheet 42 to the area between the counter roller 46 and the conveyance belt 51 again. Furthermore, the top surface of the double-sided unit 71 serves as a manual sheet feeding tray 72.

Moreover, as shown in FIG. 2, in a non-printing area on one side in the scanning direction of the carriage 33, there is provided a maintenance and restoration mechanism 81 that maintains and restores the condition of the nozzles of the recording head 34. The maintenance and restoration mechanism 81 has cap members 82*a* and 82*b* (referred to as a "cap 82" when they are not discriminated) that cap the nozzle surfaces of the recording head 34; a wiper member (wiper blade) 83 that wipes off the nozzle surfaces; an idle-ejection receiver 84 that receives liquid droplets ejected when an idle ejection for ejecting the liquid droplets that do not contribute to recording is performed so as to eject a thickened recording liquid; a carriage lock 87 that locks the carriage 33; and the like. Furthermore, at a place below the maintenance and restoration mechanism 81 of the recording head 34, a waste tank 100 that accommodates a waste liquid caused by a maintenance and restoration operation is attached so as to be replaceable from the apparatus main body 1.

Furthermore, as shown in FIG. 2, in the non-printing area on the other side in the scanning direction of the carriage 33, there is provided an idle-ejection receiver 88 that receives liquid droplets ejected when the idle ejection for ejecting the liquid droplets that do not contribute to recording is performed so as to eject a thickened recording liquid during the recording. The idle-ejection receiver 88 has, for example, an opening part 89 along the direction of the nozzle rows of the recording head 34.

In the image forming apparatus thus configured, the sheets 42 are separated and fed one by one from the sheet feeding tray 2. Then, the sheet 2 fed in a substantially vertical direction is guided by the guide member 45 and conveyed in such a manner as to be held between the conveyance belt 51 and the counter roller 46. After that, the sheet 2 is pressed against the conveyance belt 51 by the tip-end pressurizing roller 49 with its tip end guided by the conveyance guide member 49 and caused to change its conveyance direction by approximately 90 degrees.

At this time, an alternating voltage is applied to the charging roller 56 so that positive and negative outputs are alternately repeated. As a result, the conveyance belt 51 is charged with an alternating charged voltage pattern. In other words, positive and negative voltages are alternately applied onto the conveyance belt 51 in a strip shape with a predetermined width in the sub-scanning direction as the rotating direction of the charging roller 56. When the sheet 42 is fed onto the conveyance belt 51 onto which the positive and negative voltages are alternately applied, it is attracted onto the conveyance belt 51 and conveyed in the sub-scanning direction in conjunction with the rotation of the conveyance belt 51.

When the recording head 34 is driven in accordance with image signals as the carriage 33 moves, ink droplets are ejected onto the sheet 42 so as to perform recording for one row. After the sheet 42 is conveyed by a predetermined amount, it undergoes recording for the next row. When receiving a recording end signal or a signal indicating that the rear end of the sheet 42 has reached a recording area, the image forming apparatus ends the recording operation and discharges the sheet 42 to the sheet catching tray 3.

When the maintenance and restoration of the nozzles of the recording head 3 is performed, the carriage 33 is moved to a position facing the maintenance and restoration mechanism 81 as a home position. At the position, the maintenance and restoration operation, such as nozzle suction in which the nozzles are capped with a cap member 82 and ink droplets are suctioned from the nozzles and the idle ejection for ejecting the liquid droplets that do not contribute to image formation, is performed. As a result, image formation with stable ejection of liquid droplet can be performed.

Figure 3:
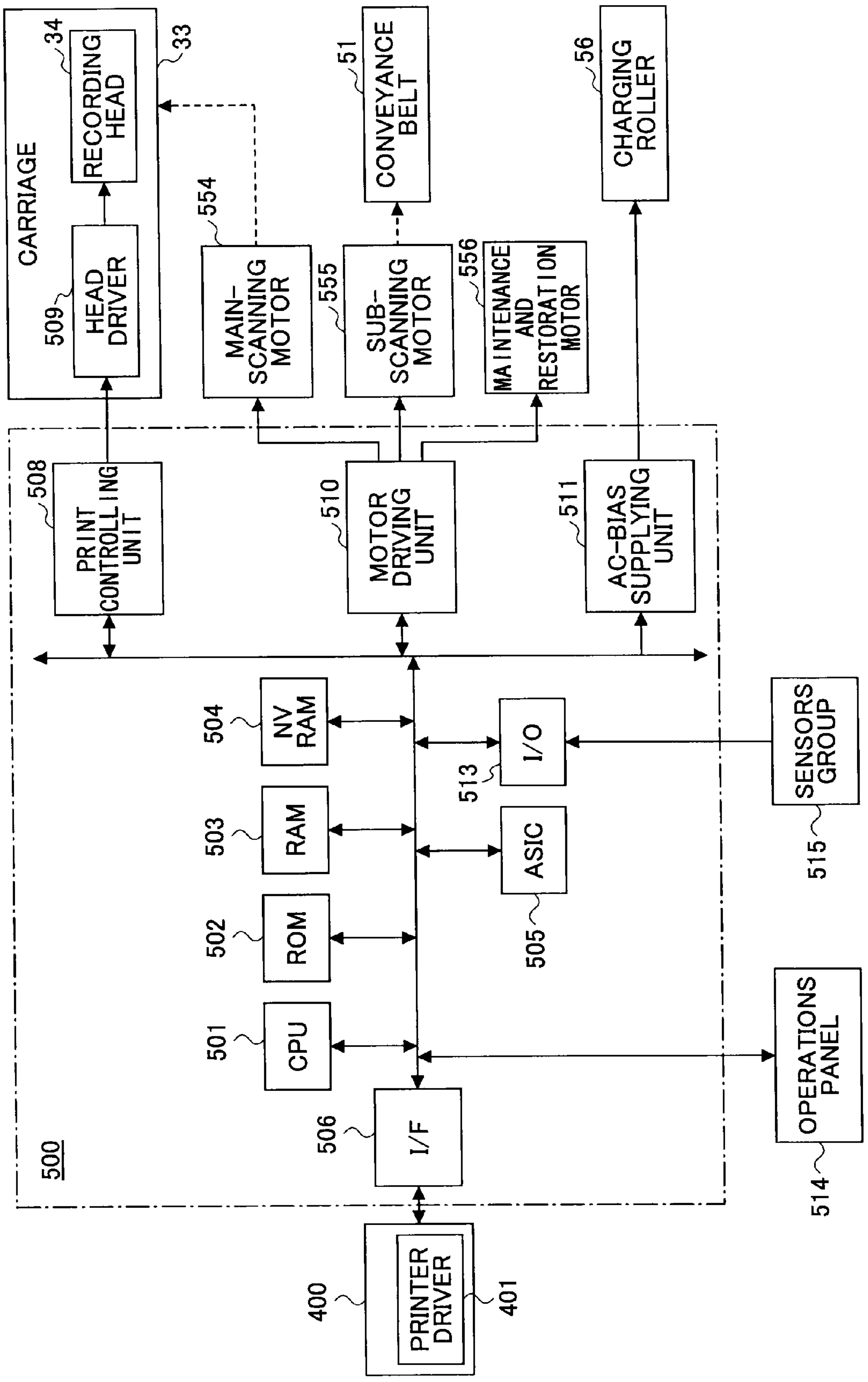
FIG. 3 is a schematic block diagram for explaining a controlling unit of the image forming apparatus.

Referring next to FIG. 3, a description is made of an outline of a controlling unit of the image forming apparatus. Note that FIG. 3 is a block diagram for entirely explaining the controlling unit.

The controlling unit 500 is the controlling unit of the equipment according to the embodiment of the present invention that entirely controls the image forming apparatus. The controlling unit 500 has a CPU 501 that entirely controls the image forming apparatus; a ROM 502 that stores programs including a program according to the embodiment of the present invention executed by the CPU 501 and other fixed data; a RAM 503 that temporarily stores image data, etc.; a rewritable non-volatile memory 504 that maintains data even when the power of the image forming apparatus is turned off; and an ASIC 505 that performs image processing in which various signals for image data are processed and rearranged and that processes input and output signals for entirely controlling the image forming apparatus.

In addition, the controlling unit 500 has a print controlling unit 508 that includes a data transferring unit and a driving-signal generating unit for driving and controlling the recording head 34; a head driver (driver IC) 509 that drives the recording head 34 provided on the side of the carriage 33; a motor driving unit 510 that drives a main-scanning motor 554 for causing the carriage 33 to move and scan, a sub-scanning motor 555 for causing the conveyance belt 51 to revolve, and a maintenance and restoration motor 556 of the maintenance and restoration mechanism 81; an AC-bias supplying unit 511 that supplies an AC bias to the charging roller 56; etc.

The controlling unit 500 is connected to an operations panel 514 on which information required for the image forming apparatus is input and displayed.

By using an I/F 506, the controlling unit 500 transmits and receives data and signals to and from a host 400 of an information processing apparatus such as a personal computer, an image reading apparatus such as an image scanner, an image pickup device such as a digital camera, via a cable or a network.

Then, the CPU 501 of the controlling unit 500 reads and analyzes the printing data of a receiving buffer included in the I/F 506, causes the ASIC 505 to perform necessary image processing and rearrangement processing on the printing data, and causes the image data to be transferred from the print controlling unit 508 to the head driver 509. Note that dot pattern data for outputting an image are generated by a printer driver 401 of the host 400.

The print controlling unit 508 transfers the above image data in the form of serial data and outputs a transfer clock, a latch signal, a control signal, etc., necessary for transferring the image data and determining the transferring of the image data to the head driver 509. Furthermore, the print controlling unit 508 includes a driving signal generating unit composed of a D/A converter that performs D/A conversion of the pattern data of a driving pulse stored in the ROM 502, a voltage amplifier, a current amplifier, etc., and outputs a driving signal composed of one driving pulse or plural driving pulses to the head driver 509.

In order to drive the recording head 7, the head driver 509 selectively applies the driving pulse constituting the driving signal transmitted from the print controlling unit 508 based on serially-input image data corresponding to one row of the recording head 34 to a driving element (for example, a piezoelectric element) that generates energy for ejecting liquid droplets from the recording head 7. In this case, the head driver 509 can appropriately determine and eject different sizes of liquid droplets such as large liquid droplets, medium liquid droplets, and small liquid droplets by selecting the driving pulse constituting the driving signal.

An I/O unit 513 acquires information from a sensors group 515 attached to the image forming apparatus, extracts information necessary for controlling a printer, and uses the extracted information for controlling the print controlling unit 508, the motor driving unit 510, and the AC-bias supplying unit 511. The sensors group 515 has an optical sensor that detects the position of a sheet, a thermistor that monitors the temperature inside the image forming apparatus, a sensor that monitors the voltage of the charging belt, an interlock switch that detects the opening/closing of a cover, etc. The I/O unit 513 can process various sensor information items.

Next, a description is made of the embodiment of the present invention applied to the image forming apparatus.

Figure 4:
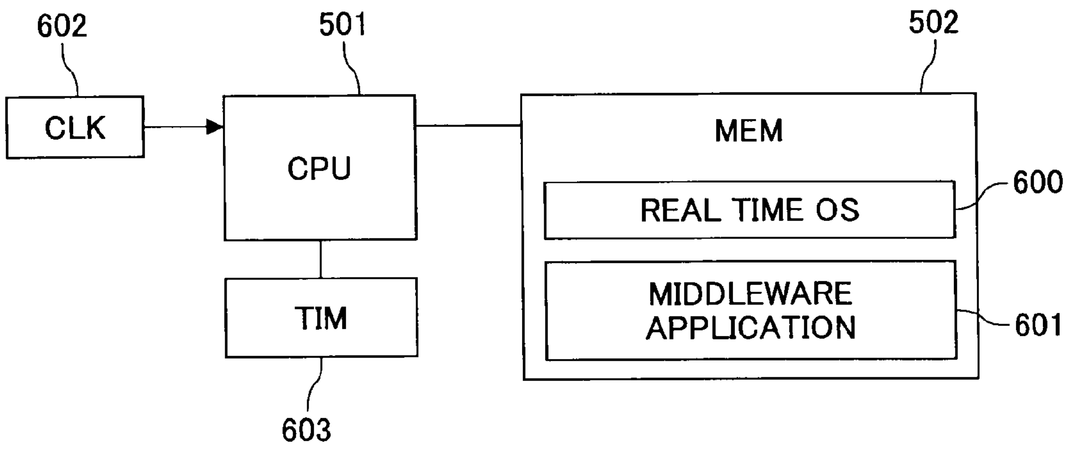
FIG. 4 a function block diagram of a substantial part for explaining the embodiment of the present invention applied to the image forming apparatus.

First, referring to a function block diagram shown in FIG. 4, the CPU 501 of the controlling unit 500 controls the image forming apparatus in accordance with an application and middleware (control program) stored on the memory (ROM 502). The CPU 501 manages the program using a real time OS 600 because the control program is large in size.

A clock (CLK) 602 supplies an execution clock to the CPU 501, and then the CPU 501 further divides the frequency of the execution clock to execute instructions. If the CPU 501 has no control program to be executed, a WAIT instruction is issued from the real time OS 600 to the CPU 501 to cause the CPU 501 to switch to a low power mode (energy-saving mode of the CPU 501 itself).

In the low power mode, the frequency-dividing rate of the cycle of the execution clock of the CPU 501 is roughly set, or the RAM 503 is caused to switch to a mode in which data can be maintained although writing of data cannot be permitted. Thus, power can be saved.

The CPU 501 has a timer module (TIM) 603, and the real time OS 600 causes the timer module 603 to generate an interrupt at a predetermined time interval and manages absolute time and standby time of tasks. This management by the real time OS 600 is called a "system timer."

Figure 5:
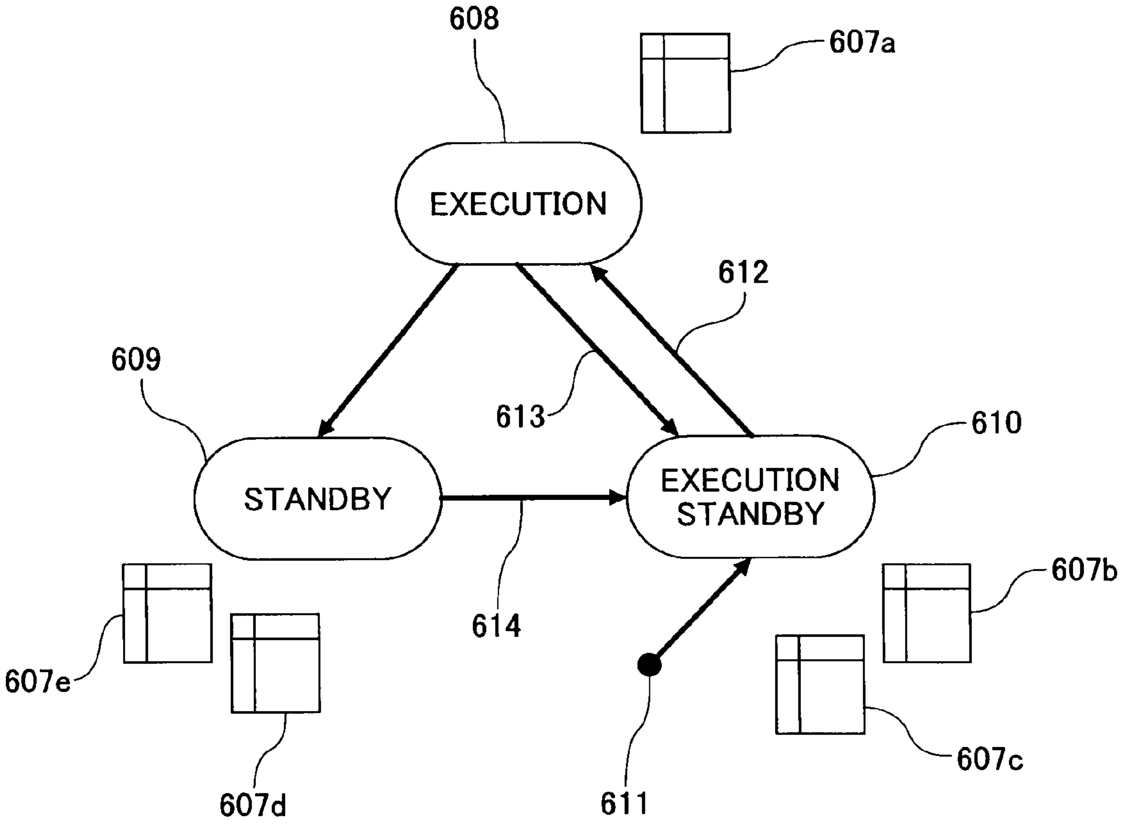
FIG. 5 is a diagram for explaining the state transitions of tasks of a general real time OS.

Referring next to FIG. 5, a description is made of the state transitions of tasks of a general real time OS.

Tasks 607 (607*a* through 607*e*) transit to any of an execution state 608, a standby state 609, and an execution standby state 610. In an initial state 611, the tasks 607 are not activated. In dispatch 612, the task 607 having a high priority among those in the execution standby state transits to the execution state. In preempt 613, when the task having a priority higher than that of the task in the execution state is dispatched, the task in the execution state transits to the execution standby state. In awakening 614, the task in the standby state 609 transits to the execution standby state 610.

Here, if the equipment (image forming apparatus) is in a state in which it is not activated at all such as the energy-saving mode of the equipment, all the tasks 607 transit to the standby state 609. Because there is no task 607 to be executed, the task management program of the real time OS 600 issues the WAIT instruction to the CPU 501 to cause the CPU 501 to switch to the low power mode. The restoration from the low power mode is performed by an interrupt.

Here, as described above, the controller of the image forming apparatus is required to have the hard real time property to control a motor, etc. Therefore, if the system timer is caused to generate an interrupt in units of 1 msec so as to deal with this requirement, the restoration from the low power mode must be performed every 1 ms. As a result, low-power effects in the low power mode of the CPU 501 cannot be appropriately obtained.

Figure 6:
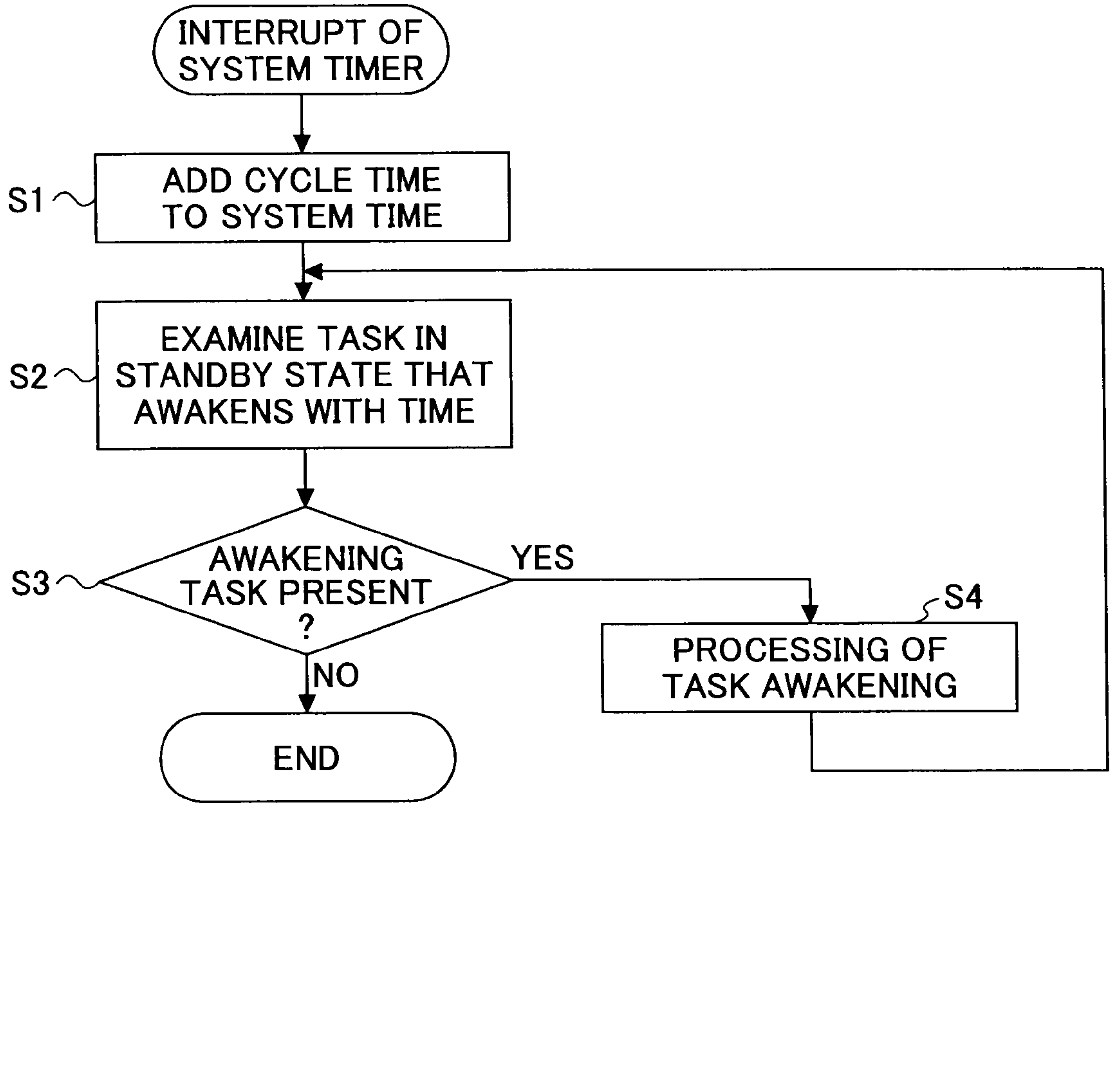
FIG. 6 is a flowchart for explaining interrupt processing of a general system timer.

Referring next to FIG. 6, a description is made of interrupt processing of a normal system timer so as to compare with the system timer according to the embodiment of the present invention.

After the interrupt of the system timer is activated, system time is updated in step S1 (hereinafter simply referred to as "S1"). Because the real time OS manages elapsed time after the input of power as the system time, it adds the cycle time of the timer to the system time to manage the time. Then, in S2, the standby time of the task in the standby state that awakens with time among those in the standby state is examined. Here, if there is any task required to awaken in S3, the task is caused to awaken using the task scheduling function of the real time OS in S4.

Here, when the image forming apparatus switches to the energy-saving mode, there is no function required to have the hard real time property. Therefore, the task that is executed at a constant cycle does not also execute processing such as printing. For this reason, even if the hard real time property is not assured, no problem arises.

According to the embodiment of the present invention, when the image forming apparatus as equipment switches to the energy-saving mode and all the tasks transit to the standby state, the interrupt cycle of the system timer is changed to a safe value integral multiple of a value at a normal mode so that the cycle of the system timer is defaulted when the awakening of the tasks are generated by all the interrupts including the system timer. Accordingly, there is less likelihood that the low power mode (energy-saving mode) of the CPU 501 is inhibited at a short cycle of the system timer. As a result, it becomes possible to reduce a current at the energy-saving mode.

Figure 7:
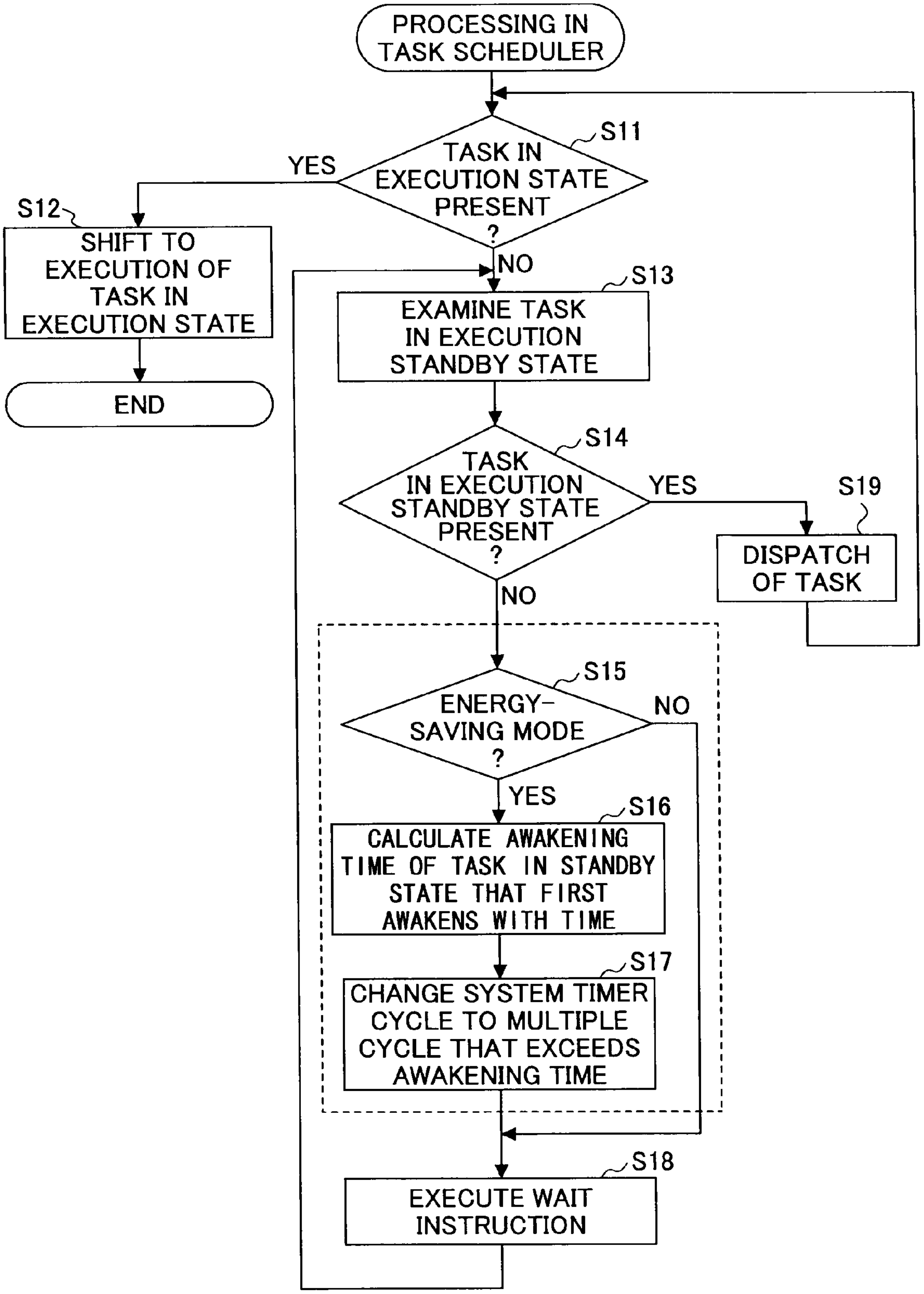
FIG. 7 is a flowchart for explaining processing by a program that performs the task scheduling of the real time OS according to the embodiment of the present invention.

Referring next to the flowchart of FIG. 7, a description is made of processing by a program that performs the task scheduling of the real time OS according to the embodiment of the present invention.

A task scheduler is a program that smoothly controls the task in the execution state. It is required that the task in the execution state, the task in the execution standby state, and the task in the standby state be organized before the execution of the program.

First, in S11, it is determined whether there is any task in the execution state. If the task in the execution state is present, the task in the execution state is executed in S12 where the following program having ended before the task is executed. Note that an end after S12 does not mean returning to the position of the program after calling of the task scheduler.

On the other hand, if the task in the execution state is absent, the task that next transits to the execution state is retrieved in S13 (task in the execution standby state is examined). Then, in S14, it is determined whether there is any task in the execution standby state.

If it is found from the result in S14 that the task in the execution standby state is present, the task is dispatched and the process returns to the determination of the presence or absence of the task in the execution state in S11.

On the other hand, if it is found from the result in S14 that the task in the execution standby state is absent, all the tasks are in the standby state. Therefore, the process proceeds to S15 where it is determined whether the apparatus is in the energy-saving mode.

If it is found from this determination that the apparatus is not in the energy-saving mode, the process proceeds to S18 where the WAIT instruction is issued to cause the CPU 501 to switch to the low power mode.

On the other hand, if it is found from this determination that the apparatus is in the energy-saving mode, the time until the awakening of the task that awakens with time among those in the standby state (awakening time) is first calculated in S16. Then, in S17, the least common multiple of the cycle of the normal system timer and the time until the task awakens is set as the cycle of the system timer. After this, the process proceeds to S18 where the WAIT instruction is issued to cause the CPU 501 to switch to the low power mode.

Note that the calculation of the time until the awakening of the task in S16 is not mandatory. This is because the energy-saving mode of the image forming apparatus causes no problem in operations even if it cannot assure the hard real time property. In this case, if there is no problem in the system and the multiple of the cycle of the normal system timer is set, the advantages of the embodiment of the present invention can be attained. In addition, in the system in which the management of the system time is not required, the setting of the multiple of the cycle of the normal system timer is not mandatory.

As described above, according to the program, when the state of the equipment switches to the energy-saving mode in which consumption power is reduced, it is determined whether there is any execution task. If it is found that there is no execution task, the interrupt cycle of the system timer of the real time OS that generates an interrupt for causing the CPU 501 to awaken is set to be long, and the CPU 501 is caused to switch to the low power mode. As a result, it becomes possible to perform energy saving more effectively while assuring the hard real time property at normal times.

In other words, when the operations of the equipment are restricted in the energy-saving mode, the CPU also switches to the low power mode. However, when the cycle of the system timer used in the real time OS is short, the low power mode is cancelled (CPU is awakened) in a short period of time by the interrupt of the system timer. As a result, power saving cannot be attained. In order to deal with this problem, the CPU 501 is also caused to switch to the low power mode when the operations of the equipment are prevented in the energy-saving mode, and the interrupt cycle of the system timer that causes the CPU 501 to awaken is set to be long so as not to cause problems in terms of system settings. Therefore, the time until the awakening of the CPU 501 is made long. As a result, more energy saving can be attained.

In this case, as described above, the interrupt cycle of the system timer when the CPU 501 is caused to switch to the low power mode is set to the activation time of the task that awakens next. As a result, the energy saving at the energy-saving mode and the hard real time property with high accuracy can be attained.

Figure 8:
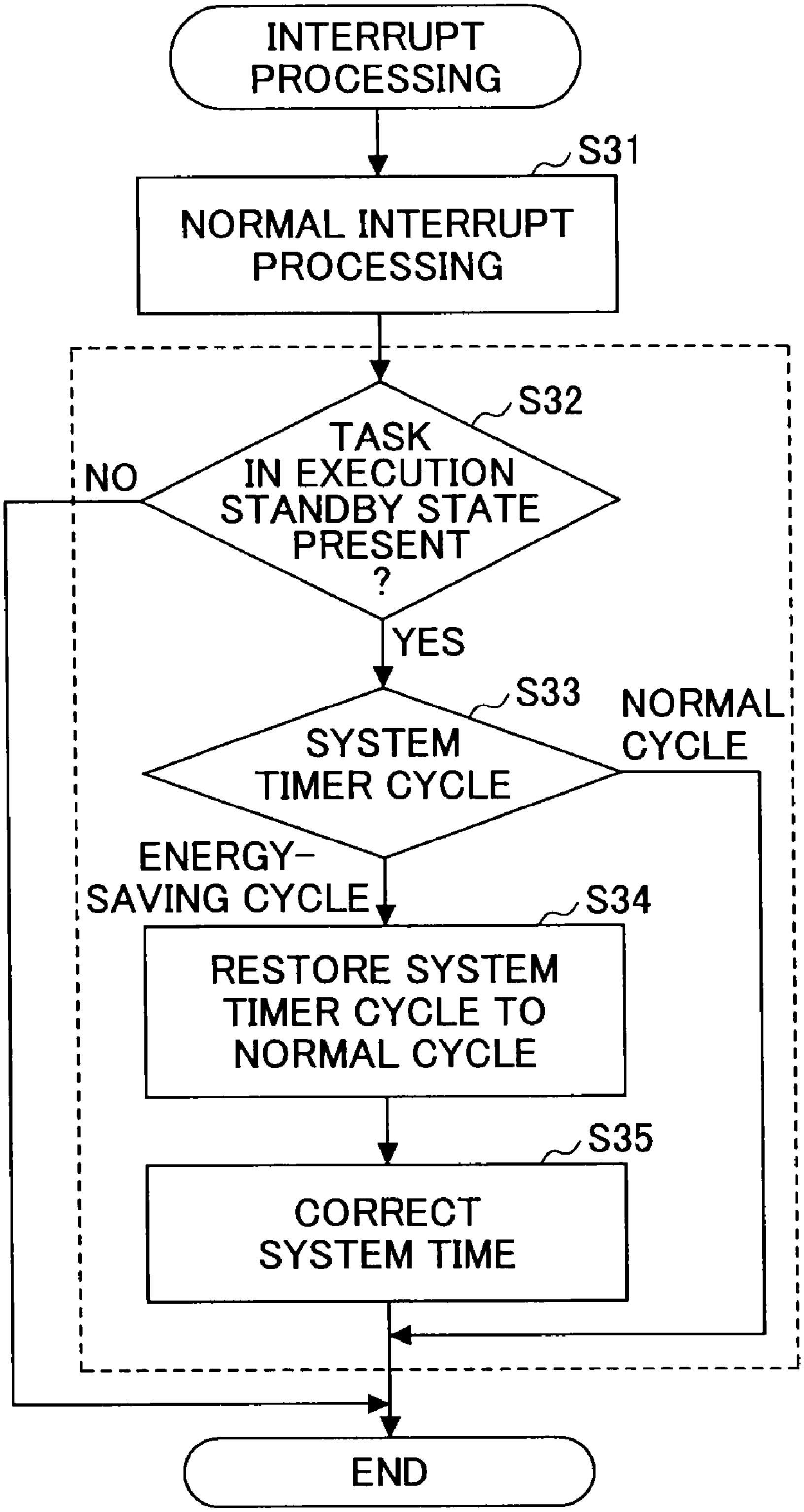
FIG. 8 is a flowchart for explaining interrupt routines of all the interrupts used in a system according to the embodiment of the present invention.

Referring next to the flowchart of FIG. 8, a description is made of interrupt routines of all the interrupts used in this system.

As described above, the task in the standby state transits to the execution standby state in accordance with the interrupt processing. Note that when the real time OS adds a management program other than the transitions of the task states after the occurrence of the interrupt, the addition of the program must be completed at this point in order to start the interrupt processing.

In S31, general interrupt processing is performed. As a result, if the task in the execution standby state occurs, the processing according to the embodiment of the present invention is performed in S32. In other words, in S33, it is determined whether the cycle of the system timer is a long cycle in the energy-saving mode (energy-saving cycle) or a normal cycle. If it is determined to be the energy saving cycle, the cycle of the system timer is restored to the normal cycle in S34. Then, in S35, correction is made so as not to generate an error in system time at the next interrupt of the system timer.

Here, the correction of the system time is described. When the system does not have a RTC (real time clock), the system time sometimes serves as a time clock. Therefore, if an error is generated in the system time, failure may be caused in the system. For this reason, the correction of the error in the system time is made. This correction can be made in the following ways (1) and (2).

(1) In the Case of Using an Existing Timer Logic

Figure 9:
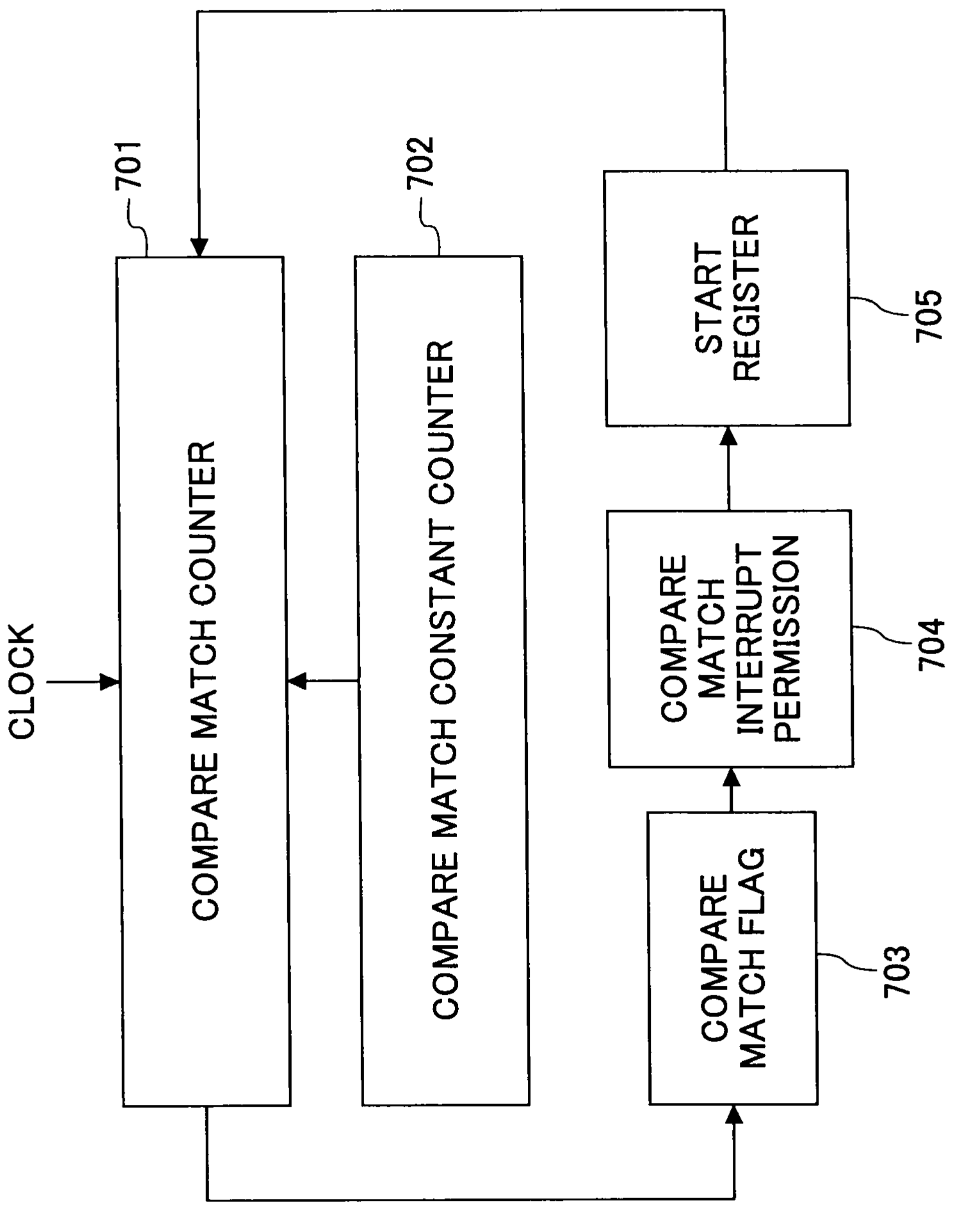
FIG. 9 is a diagram showing a compare match timer used as a general timer for explaining a first example of system time correction.

FIG. 9 is a diagram showing a compare match timer used as a normal timer.

A compare match counter 701 adds a counter value by the number of input clocks. If this value agrees with the value of a compare match constant counter 702, it is cleared to 0 (zero) and a compare match flag 703 transits to "1." If a compare match interrupt permission setting 704 is "1" when they agree with each other, an interrupt occurs. When "1" is set to a start register 705, the addition by the compare match counter 701 is started. When the value of the compare match constant counter 702 is set to the interrupt cycle of the system timer, it can be used as a timer used in the real time OS.

Figure 10:
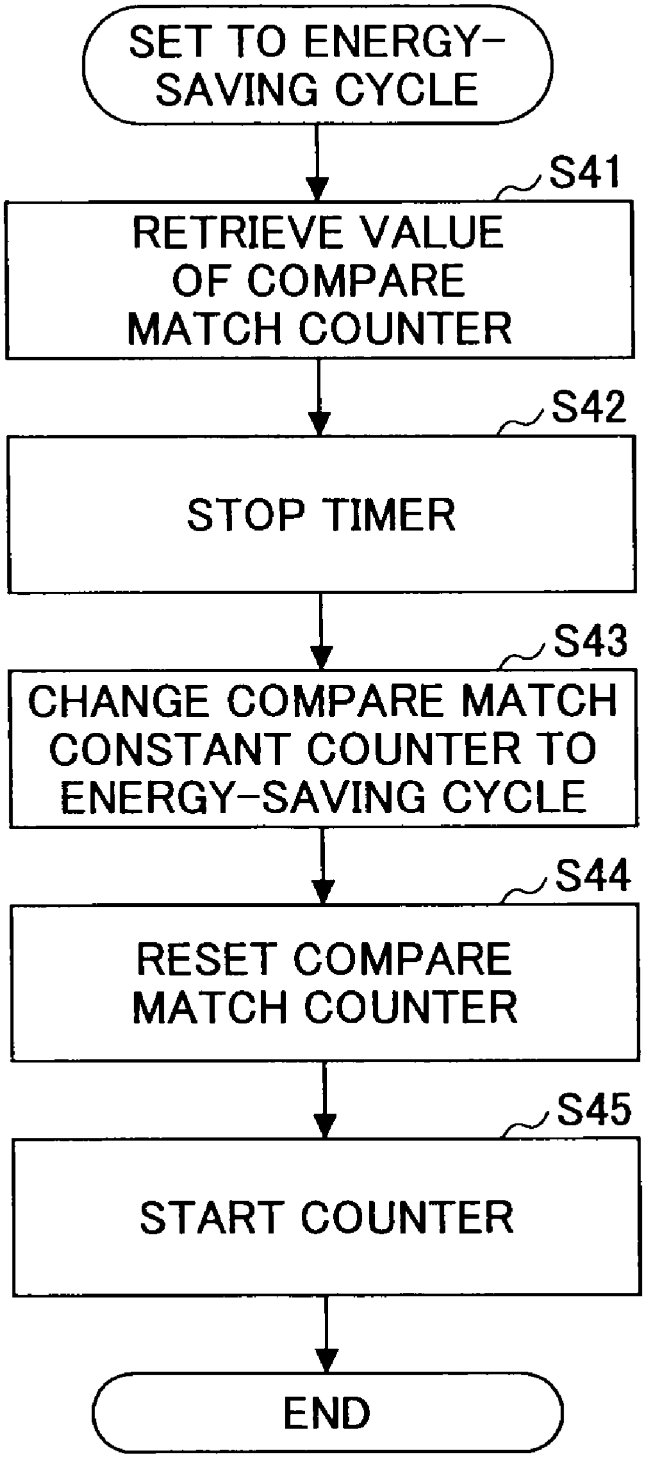
FIG. 10 is a flowchart for explaining processing for setting an energy-saving cycle in a time scheduler to the system timer in the first example.

Here, referring next to the flowchart of FIG. 10, a description is made of processing for setting the energy-saving cycle in the time scheduler to the system timer.

In S41, a present value is retrieved from the compare match counter 701. For example, when the normal cycle is 1 msec, elapsed time within 1 msec can be retrieved as a counter value. In S42, the start register 705 is set to "0" to stop the timer. Then, in S43, the compare match constant counter 702 is reset to the counter value (changed to the energy-saving cycle) of the system timer at the energy-saving mode. Next, the compare match counter 701 is reset in S44, and the start register 705 is set to "1" in S45. Thus, the timer is restarted (counter is started). At this time, because the value of the compare match counter 701 is also taken over in a new cycle, an interrupt occurs at a timing multiple of the normal cycle. In this case, an error (error by an amount of time for the processing) is caused in the processing of the timer setting, but it can be reduced as small as possible.

Figure 11:
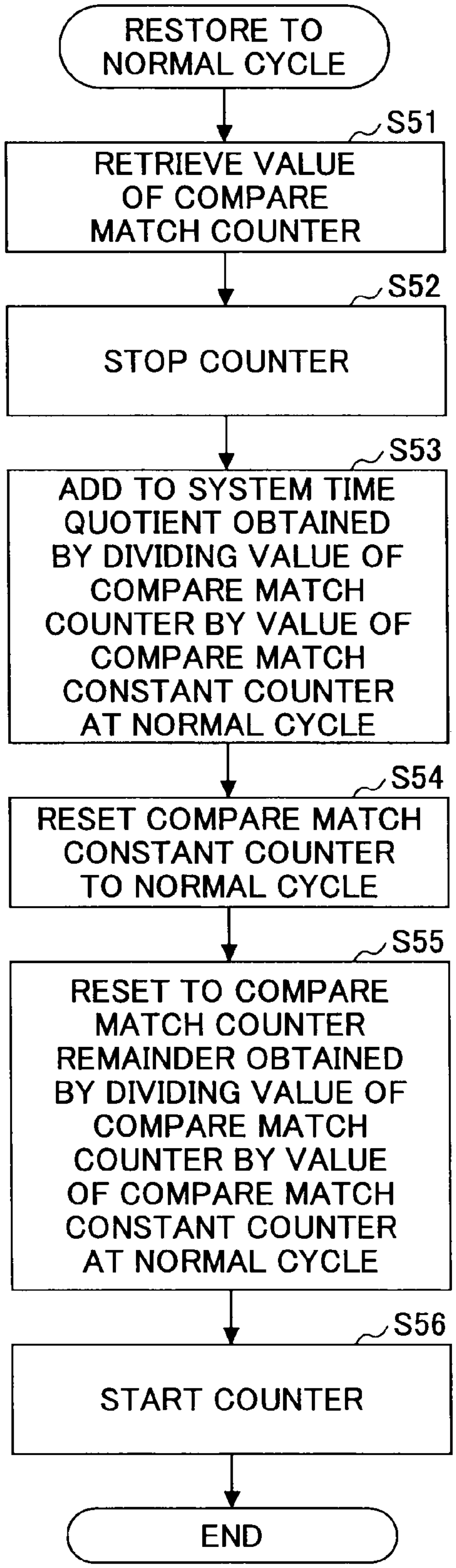
FIG. 11 is a flowchart for explaining processing in which a cycle is restored from the energy-saving cycle to the normal cycle in respective interrupt routines in the first example.

Referring next to the flowchart of FIG. 11, a description is made of processing in which the cycle is restored from the energy-saving cycle to the normal cycle in the respective interrupt routines.

First, the present value of the compare match counter 701 is retrieved in S51. Then, in S52, the start register 705 is set to "0" to stop the counter. In S53, the quotient obtained by dividing the value retrieved from the compare match counter 701 by the value set to the compare match constant counter 702 at the normal cycle is added to the system time. This value means the number of interrupts that should have interrupted in the case of the normal timer.

Next, the compare match constant counter 702 is reset (changed) to the normal cycle in S54. Then, in S55, the remainder obtained by dividing the value retrieved from the compare match counter 701 by the value set to the compare match constant counter 702 at the normal cycle is reset to the compare match counter 701. This value means represents as the counter value elapsed time until the interrupt at the normal cycle. Next, in S56, the start register 705 is set to "1" to restart the system timer.

In this case, similar to the case shown in FIG. 10, an error between the intervals of interrupts is reflected on the compare match timer as a correction value. Therefore, the cycle interval of the system timer is maintained. As a result, the error in the system time can be reduced as small as possible.

(2) In the Case of Using a Dedicated Timer Logic

Figure 12:
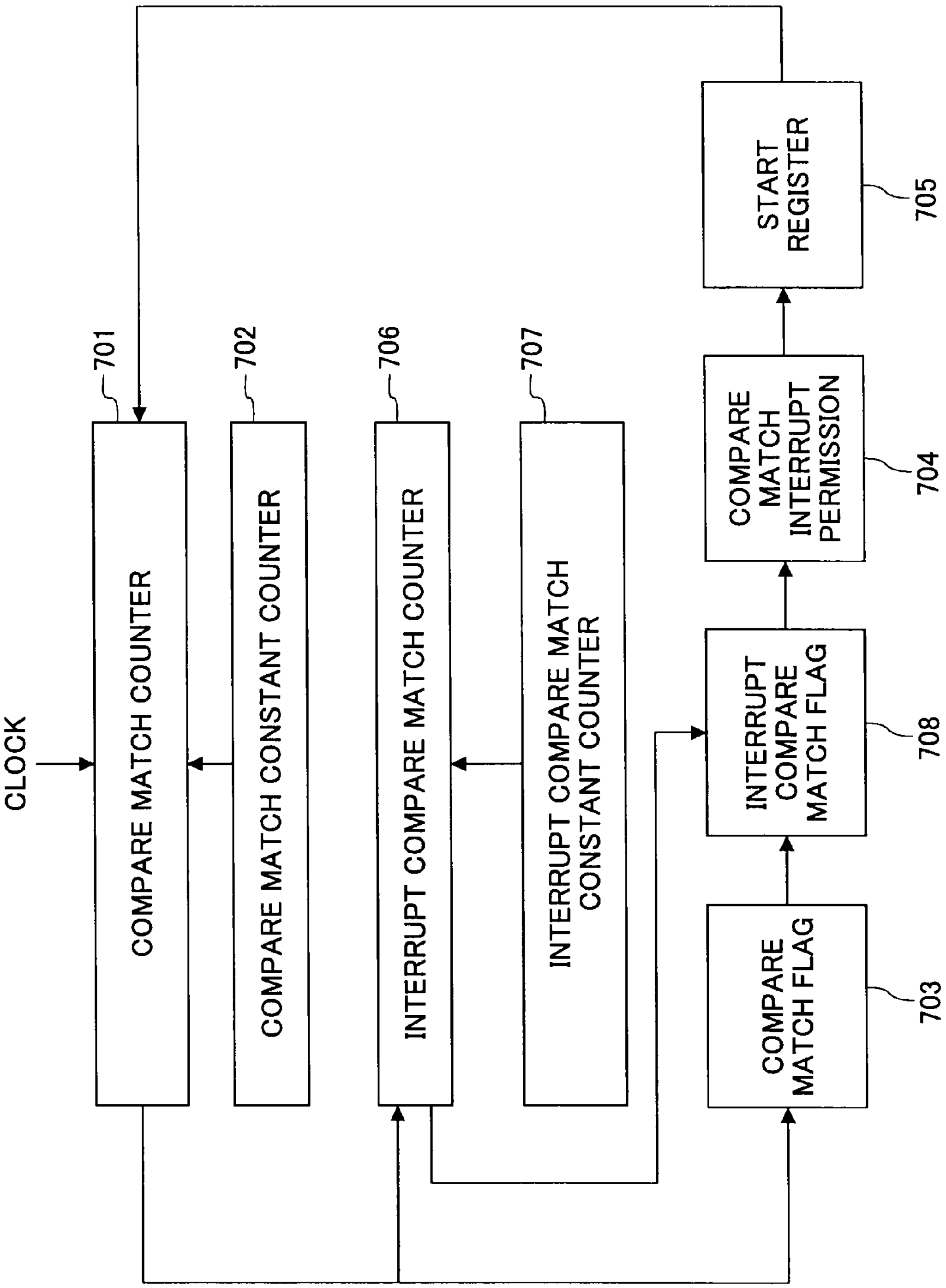
FIG. 12 is a diagram showing a dedicated timer logic for the system timer for explaining a second example of system time correction.

FIG. 12 is a diagram showing a dedicated timer logic for the system timer.

The compare match counter 701, the compare match constant counter 702, the compare match flag 703, the compare match interrupt permission 704, and the start register 705 are the same as the above. Besides, an interrupt compare match counter 706 that counts the number of times the compare match counter 701 agrees with the compare match constant counter 702, an interrupt compare match constant counter 707, and an interrupt compare match flag 708 are provided.

In this logic, an interrupt does not occur even when the compare match counter 701 and the compare match constant counter 702 agree with each other. Here, an interrupt occurs when the interrupt compare match counter 706 agrees with the interrupt compare match constant counter 707. When the interrupt compare match counter 706 and the interrupt compare match constant register 707 agree with each other, the interrupt compare match flag 708 transits to "1."

Figure 13:
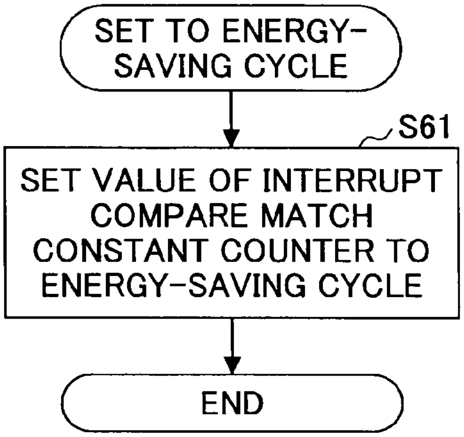
FIG. 13 is a flowchart for explaining processing for setting the energy-saving cycle in the time scheduler to the system timer in the second example.

Referring next to the flowchart of FIG. 13, a description is made of processing for setting the energy-saving cycle in the task scheduler to the system timer.

Let it be assumed that the compare match constant counter 702 is set to the normal cycle, and the interrupt compare match constant counter 707 is set to "1."

Then, in S61, the value of the interrupt compare match constant counter is set to the energy-saving cycle. This value is greater than "1" (no action is taken when the value is "1"). If the interrupt of this value is prohibited, it is possible to make the settings without stopping the timer. Because the timer is not stopped in this manner, an error in the settings is not caused.

Figure 14:
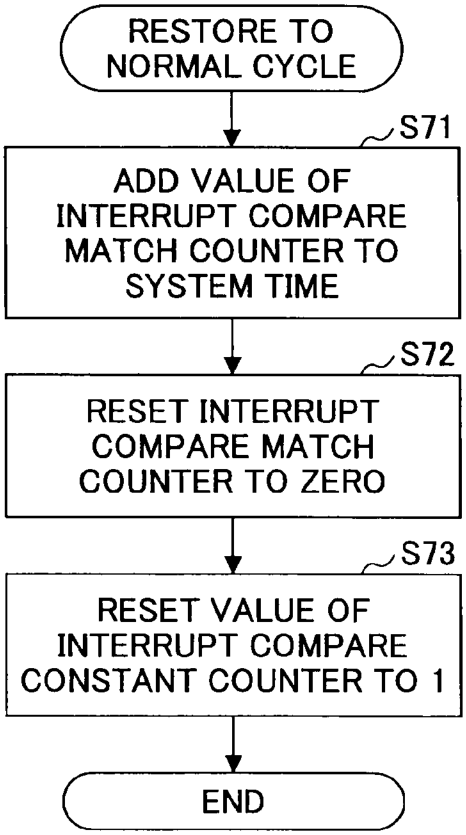
FIG. 14 is a flowchart for explaining processing in which the cycle is restored from the energy-saving cycle to the normal cycle in the respective interrupt routines in the second example.

Referring next to FIG. 14, a description is made of processing in which the cycle is restored from the energy-saving cycle to the normal cycle in the respective interrupt routines.

In S71, the value of the interrupt compare match counter 706 is retrieved and added to system time. This value means the number of counts that has not generated as the interrupt in the energy-saving cycle. When the interrupt compare match counter 706 is set to "0" in S72 and the interrupt compare match constant counter 707 is set to "1" in S74, the cycle is restored to the normal cycle. Because the timer is not stopped in this manner, an error in the settings is not caused.

As described above, with the provision of the unit that corrects an error in the system timer, the system time can be assured.

Note that in the above embodiment, the equipment controller according to the embodiment of the present invention is applied to the controlling unit of the image forming apparatus. However, the controlling controller is not limited to this. Furthermore, the image forming apparatus according to the embodiment of the present invention is not limited to an ink jet recording apparatus, but it may be an electrophotographic image forming apparatus. Furthermore, the image forming apparatus according to the embodiment of the present invention may be applied to an image forming apparatus as a liquid ejection type that ejects a liquid (recording liquid) other than ink, such as a resist and a DNA sample in the medical field. Furthermore, a program that causes a computer to perform the processing described in the embodiment may be stored in a storage medium, or it may be downloaded into an information processing apparatus on the side of a host and installed in equipment.

The present invention is not limited to the specifically disclosed embodiments, and variations and modifications may be made without departing from the scope of the present invention.

The present application is based on Japanese Priority Application No. 2008-068554 filed on Mar. 17, 2008, the entire contents of which are hereby incorporated herein by reference.

What is claimed is:

1. An equipment controller comprising a CPU that is instructed to switch to a low power mode when being in a non-execution state, wherein the equipment controller determines whether there is any execution task when a state of equipment switches to an energy-saving mode in which consumption power is reduced, and sets an interrupt cycle of a system timer of a real time OS that generates an interrupt for causing the CPU to awaken to be long if there is no execution task so that the CPU is caused to switch to the low power mode.

2. The equipment controller according to claim 1, wherein the interrupt cycle of the system timer when the CPU is caused to switch to the low power mode is set to activation time of a task that awakens next.

3. The equipment controller according to claim 1, further comprising:

a unit that corrects an error in the system timer.

4. An image forming apparatus comprising an equipment controller having a CPU that is instructed to switch to a low power mode when being in a non-execution state, wherein the equipment controller determines whether there is any execution task when a state of equipment switches to an energy-saving mode in which consumption power is reduced, and sets an interrupt cycle of a system timer of a real time OS that generates an interrupt for causing the CPU to awaken to be long if there is no execution task so that the CPU is caused to switch to the low power mode.

5. A method for controlling equipment including a CPU that is instructed to switch to a low power mode when being in a non-execution state, the method comprising the steps of:

determining whether there is any execution task when a state of equipment switches to an energy-saving mode in which consumption power is reduced; and setting an interrupt cycle of a system timer of a real time OS that generates an interrupt for causing the CPU to awaken to be long if there is no execution task so that the CPU is caused to switch to the low power mode.

* * * * *